June 14, 1927.
H. B. WORSTER
BUSHING TOOL
Filed Dec. 19, 1925
1,632,720
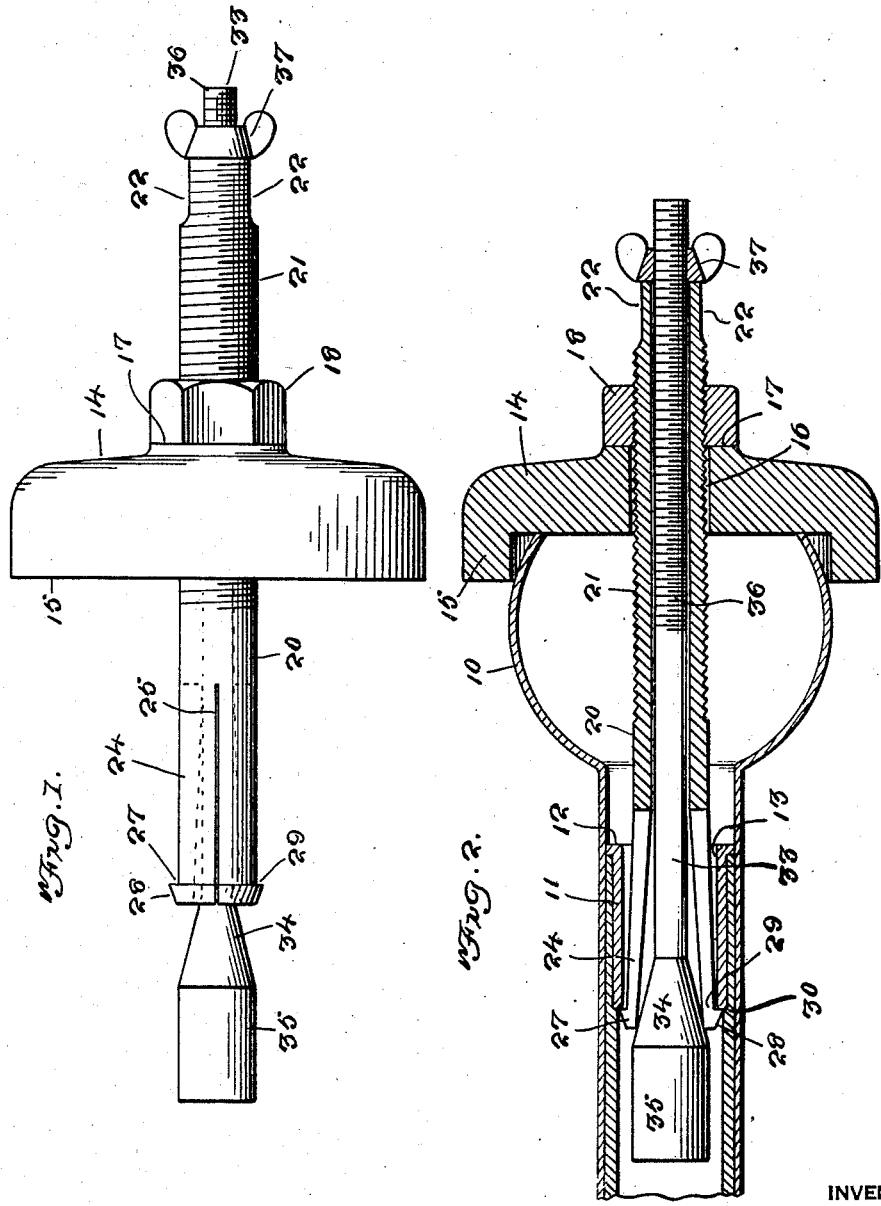
INVENTOR
*H. B. Worster*
BY *Victor J. Evans*
ATTORNEY Patented June 14, 1927.

1,632,720

UNITED STATES PATENT OFFICE.

HAROLD B. WORSTER, OF KEOKUK, IOWA.

BUSHING TOOL.

Application filed December 19, 1925. Serial No. 76,524.

The object of this invention is to remove a bushing or the like from a drive shaft housing on a motor car, being adapted for use under all similar conditions where it is desired to remove a tubular element without damage thereto or to the element in which it is mounted.

A further object is to provide a tool which shall include a split sleeve having engaging means on the end portion thereof, for contact with the inner end of the bushing, and means for spreading the end of the sleeve.

A further object is to provide engaging means on the sleeve especially adapted to be forced into the joint between the end of the bushing and the shoulder in the element into which the bushing was originally inserted by the application of considerable pressure or force.

With the foregoing and other objects in view, the invention consists in the novel construction and arrangement of elements described, illustrated, and claimed, it being understood that modifications may be made within the scope of the claim, without departing from the spirit of the invention.

In the drawings forming part of this application,

Figure 1 is a view of the device in elevation, and

Fig. 2 is a view in longitudinal section, showing the tool in position for withdrawing a bushing from a drive-shaft housing.

A housing for a driving shaft is designated 10, and the bushing to be removed is shown at 11, this bushing having an end flange 12, the opposite end usually being rounded or tapered toward the bore 13.

A casting 14 has a flanged end 15 adapted to fit over the end of the housing 10, and this element 14 is provided with a bore 16 and with a flat surface 17 against which the nut 18 is adapted to bear.

A split sleeve 20 is threaded at 21 and is provided with flat portions at 22, to permit of the application of the tool. The end of the sleeve, shown at the left in the views, includes the fingers 24, formed by providing saw cut 25 extending for a suitable distance from the end of the sleeve.

A flange is formed on the split end of sleeve 20, the flange, designated 27, in reality comprising a plurality of segmental members, beveled as shown at 28, and the edges 29 being sharp, in order that they may be forced into the joint at 30 between the end of the bushing and the elements in which it was originally inserted, where a shoulder is frequently provided, in the special construction for which the tool was particularly designed.

A spreader includes a shank portion 33, a tapered portion 34, and a cylindrical portion 35. The shank is threaded at 36, and the threaded portion is engaged by a wing nut 37 bearing against the outer end of the sleeve at 22.

The split sleeve is first retained in the correct position, by setting up nut 18. The inner member or spreader 34 is then pulled into the tapered end of sleeve 20, the walls 24 of the fingers having been reduced to form the taper. The wing-nut 37 is then set up by hand, and a wrench is applied to the flat surface at 22, and the wing-nut is further tightened and the shaft edges 29 are forced into the joint 36 above referred to. When the tool has taken hold properly the nut 18 is operated, or screwed up to a sufficient extent to extract the bushing, in an obvious manner.

Having thus described the invention, what is claimed as new is:

In a device of the class described, a tapered shank including a threaded portion, a sleeve including longitudinally projecting fingers, and the walls thereof cooperating with the tapered shank, engaging devices on the fingers and projecting outwardly therefrom, means for producing relative longitudinal movement between the shank and sleeve, the engaging devices being beveled to provide sharp edges movable outwardly incident to the aforesaid relative longitudinal movement between the shank and sleeve, and means engaging the end of the sleeve for producing thrust between the sleeve and a stationary element into which the sleeve projects.

In testimony whereof I affix my signature.

HAROLD B. WORSTER.